(12) United States Patent
Lemay

(10) Patent No.: US 10,754,116 B2
(45) Date of Patent: Aug. 25, 2020

(54) CAMERA FILTER ADAPTOR KIT

(71) Applicant: Donat Lemay, Boucherville (CA)

(72) Inventor: Donat Lemay, Boucherville (CA)

( * ) Notice: Subject to any disclaimer, the term of this patent is extended or adjusted under 35 U.S.C. 154(b) by 136 days.

(21) Appl. No.: 16/065,423

(22) PCT Filed: Dec. 21, 2016

(86) PCT No.: PCT/CA2016/051516
§ 371 (c)(1),
(2) Date: Jun. 22, 2018

(87) PCT Pub. No.: WO2017/106968
PCT Pub. Date: Jun. 29, 2017

(65) Prior Publication Data
US 2018/0372982 A1     Dec. 27, 2018

Related U.S. Application Data

(60) Provisional application No. 62/387,076, filed on Dec. 23, 2015.

(51) Int. Cl.
| | |
|---|---|
| G03B 11/00 | (2006.01) |
| G02B 7/00 | (2006.01) |
| G03B 17/56 | (2006.01) |
| G02B 7/02 | (2006.01) |
| H04N 5/225 | (2006.01) |

(52) U.S. Cl.
CPC .............. *G02B 7/006* (2013.01); *G02B 7/022* (2013.01); *G03B 11/00* (2013.01); *G03B 17/566* (2013.01); *H04N 5/2254* (2013.01)

(58) Field of Classification Search
CPC ...... G03B 11/00; G03B 17/00; G03B 17/566; G02B 7/006; G02B 7/022; H04N 5/2254
USPC ........ 359/885, 827, 828, 829, 830; 396/529, 396/530, 544, 545; 348/342
See application file for complete search history.

(56) References Cited

U.S. PATENT DOCUMENTS

| | | |
|---|---|---|
| 2,953,970 A | 9/1960 | Maynard |
| 5,040,011 A | 8/1991 | Tiffen |
| (Continued) | | |

FOREIGN PATENT DOCUMENTS

CN     202583605 U     12/2005

OTHER PUBLICATIONS

International Search Report and Written opinion, International application No. PCT/CA2016/051516, dated Jan. 25, 2017.
(Continued)

*Primary Examiner* — Audrey Y Chang
(74) *Attorney, Agent, or Firm* — Bell & Manning LLC

(57) ABSTRACT

A kit for a camera filter adaptor includes a filter retaining apparatus and a lens engagement apparatus. The filter retaining apparatus has a filter retaining portion and a first interfacing portion opposite the filter retaining portion. The retaining portion is configured for retaining a camera filter. The lens engagement apparatus has a lens coupling portion and a second interfacing portion. The lens coupling portion is configured for being coupled to a camera lens. The second interfacing portion is configured for interfacing with the first interfacing portion of the filter retaining apparatus to form an engagement therewith. The interfacing defines an interfacing diameter that is greater than a lens coupling diameter. A method for using the kit is also provided.

16 Claims, 17 Drawing Sheets

(56) References Cited

U.S. PATENT DOCUMENTS

| | | | | |
|---|---|---|---|---|
| 5,208,624 A * | 5/1993 | MacKay | ............... | G03B 11/00 |
| | | | | 396/530 |
| 5,528,328 A | 6/1996 | O'Farrill et al. | | |
| 8,014,666 B2 * | 9/2011 | Neiman | ............... | G03B 17/00 |
| | | | | 348/342 |
| 8,238,742 B2 | 8/2012 | Neiman | | |
| 9,042,719 B2 * | 5/2015 | Xu | ........................ | G03B 11/00 |
| | | | | 359/885 |

OTHER PUBLICATIONS

International Preliminary Report on Patentability, International application No. PCT/CA2016/051516, dated Mar. 23, 2018.
Extended European Search Report issued in European Application 16877046.9, dated Jun. 7, 2019, pp. 1-5.
The Intention to Grant issued in EP Patent Application No. 16 877 046.9 dated May 6, 2020, pp. 1-7.

* cited by examiner

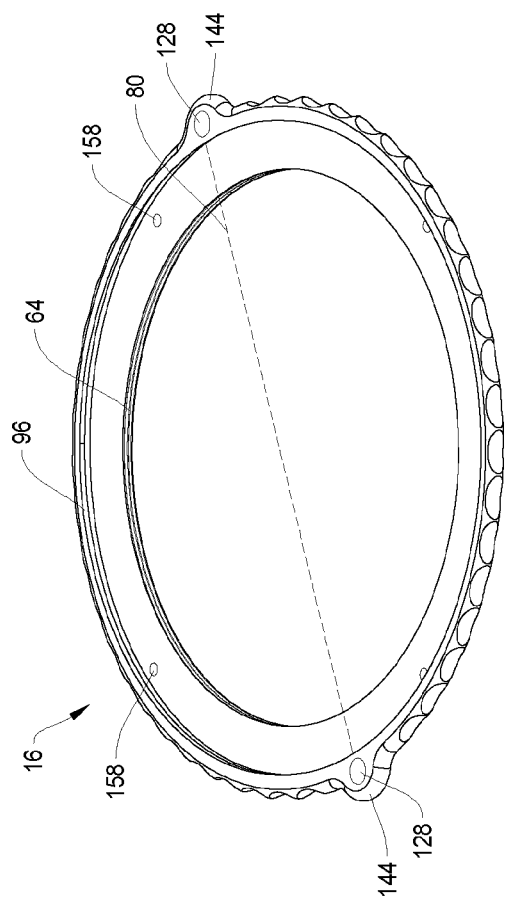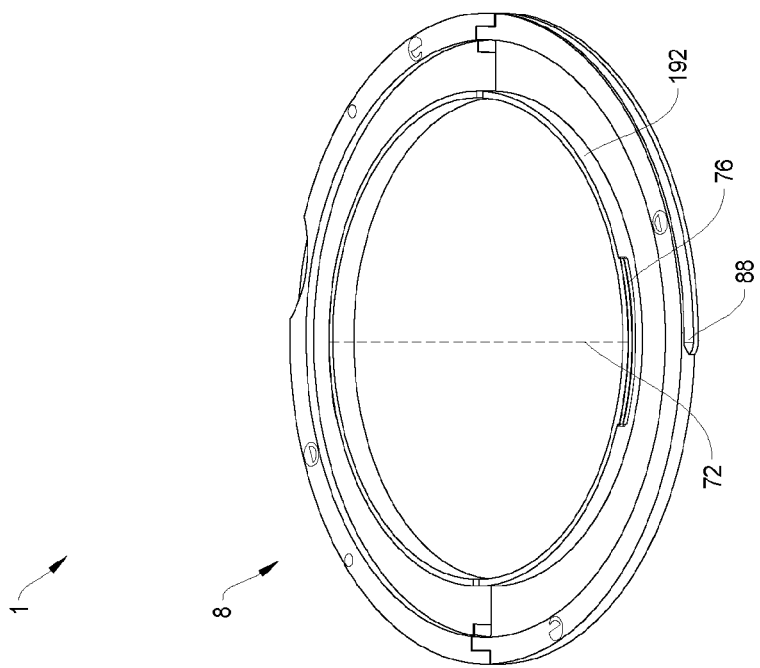
FIG. 2

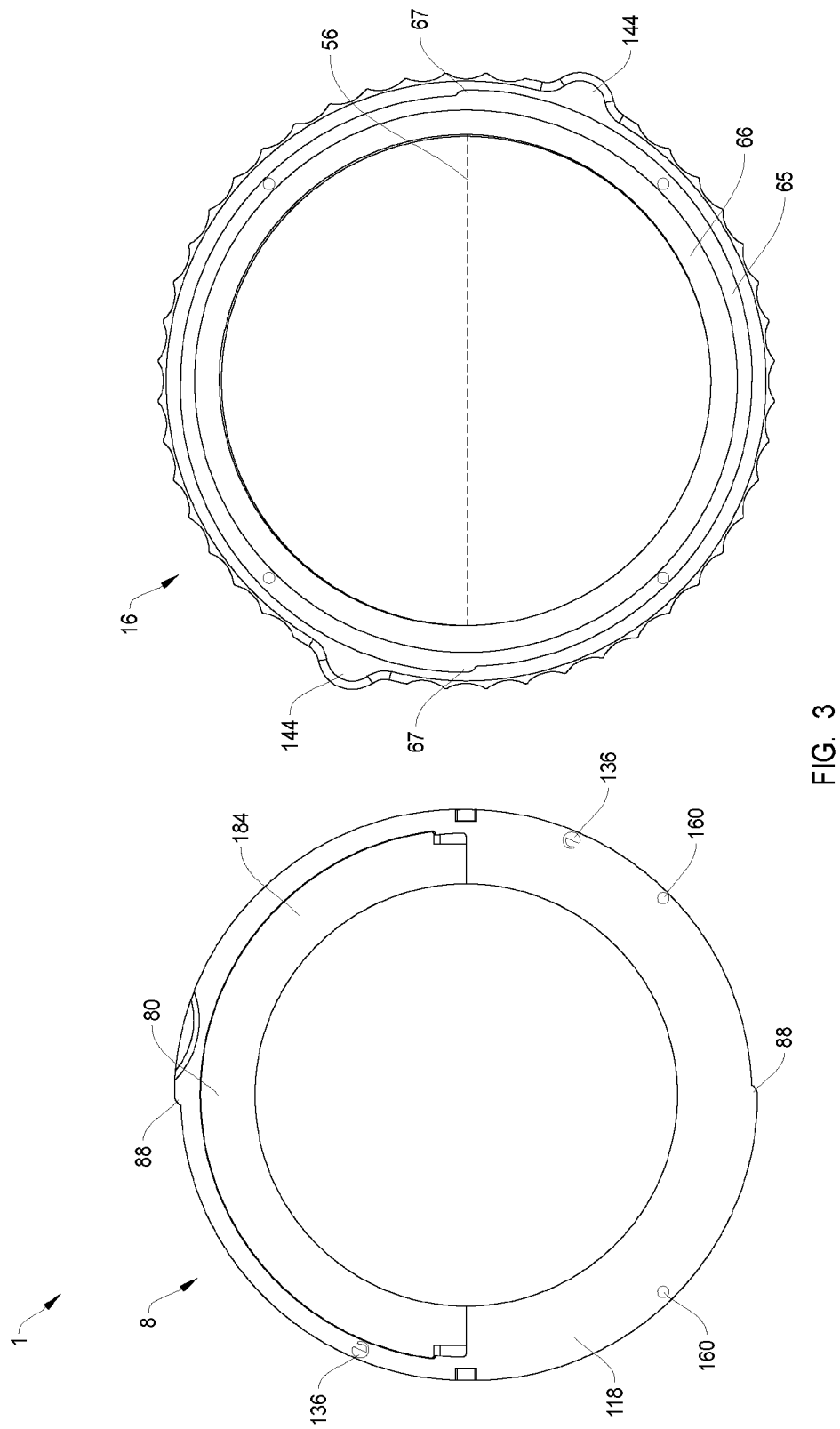

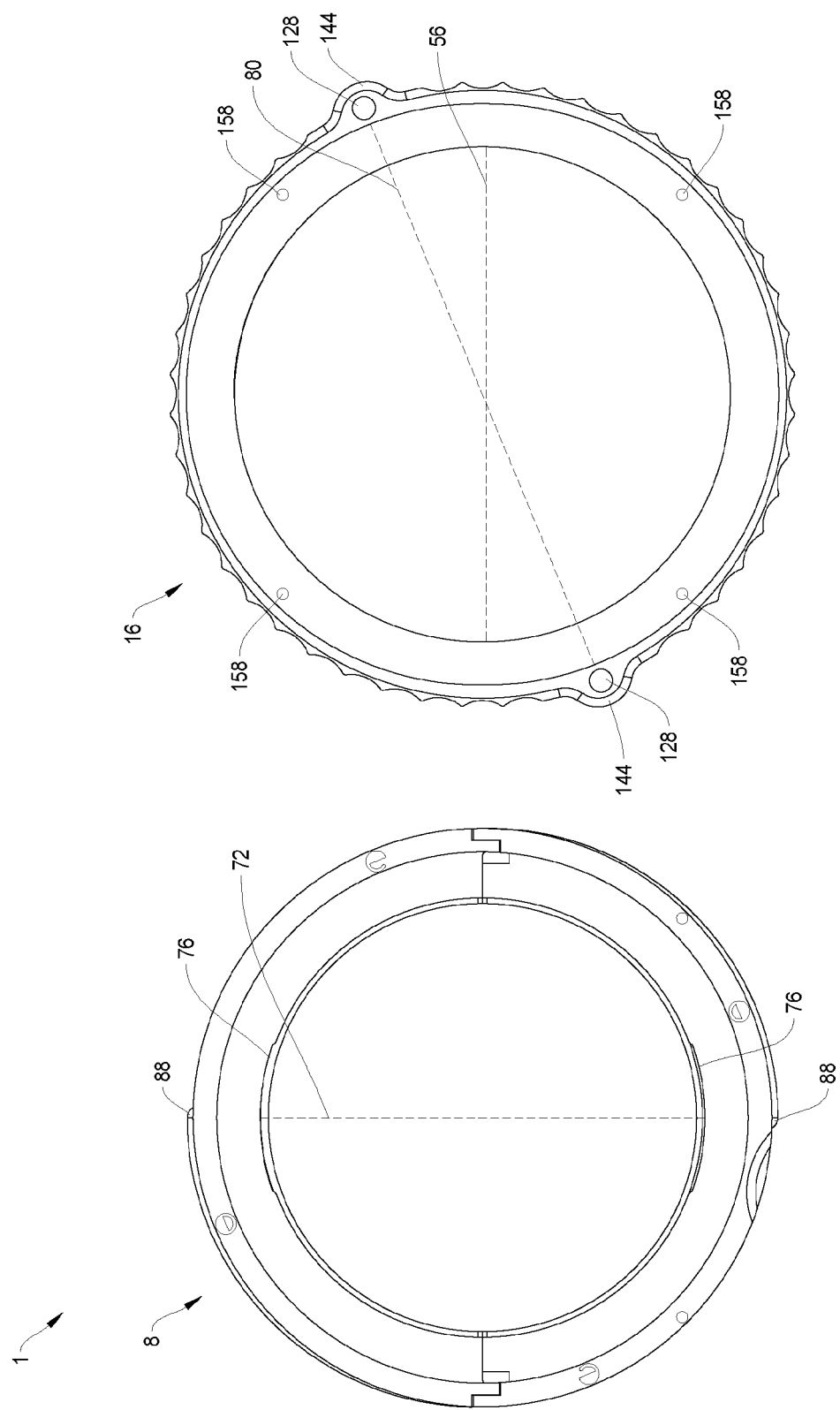

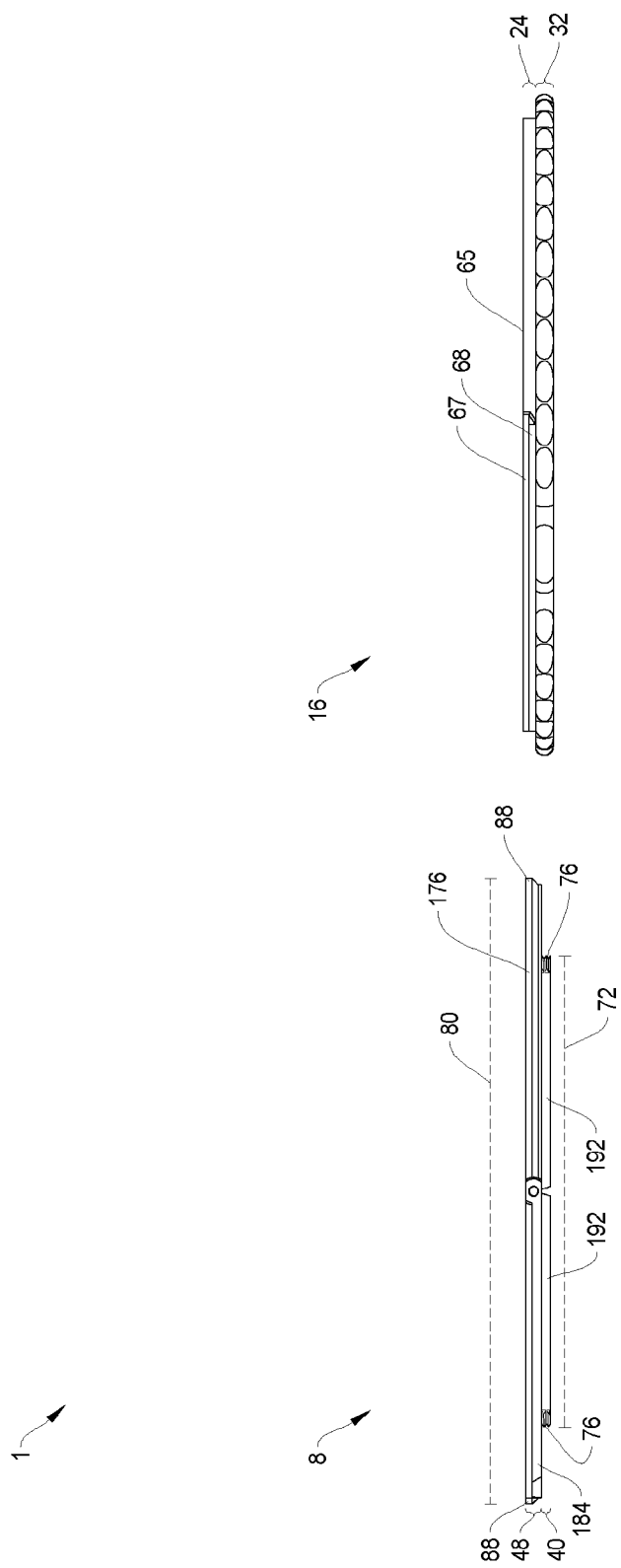

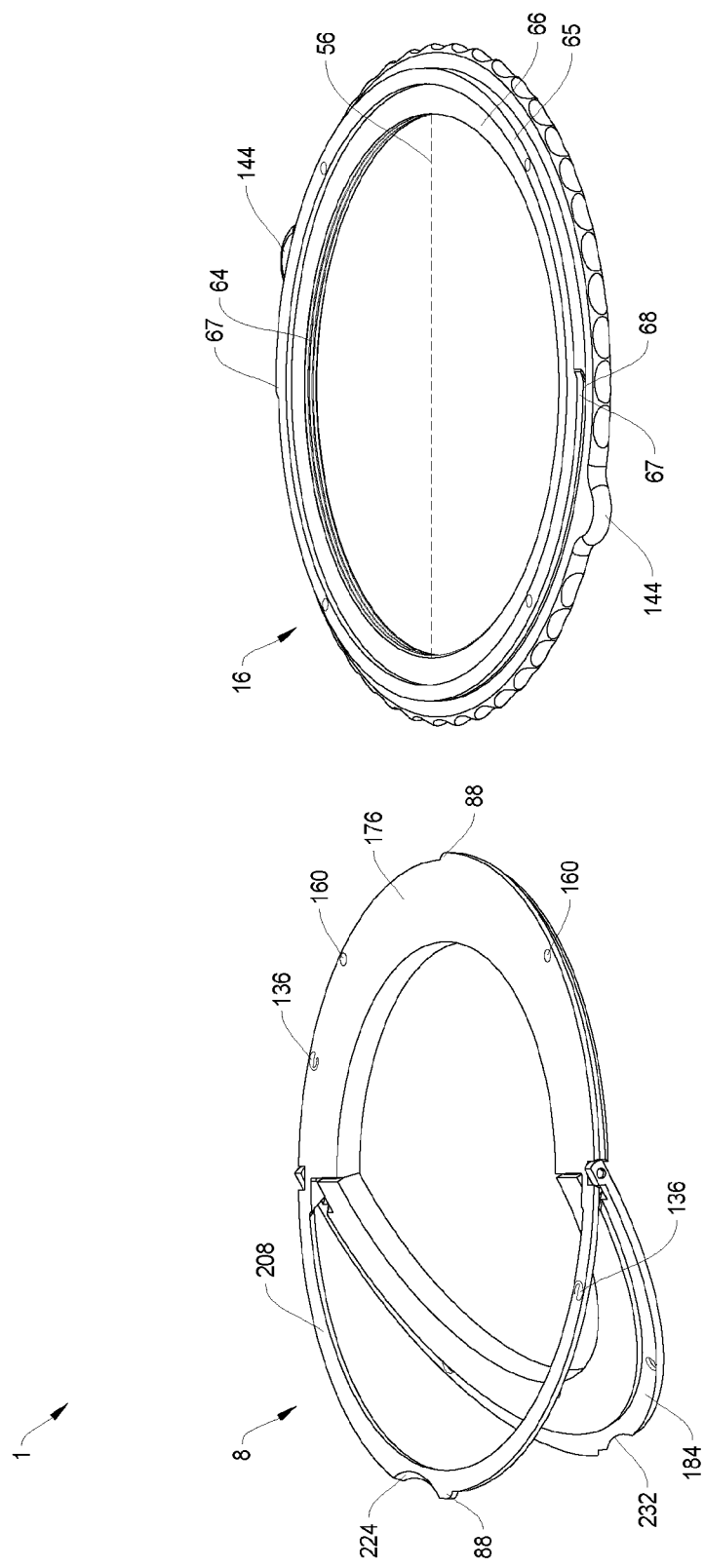

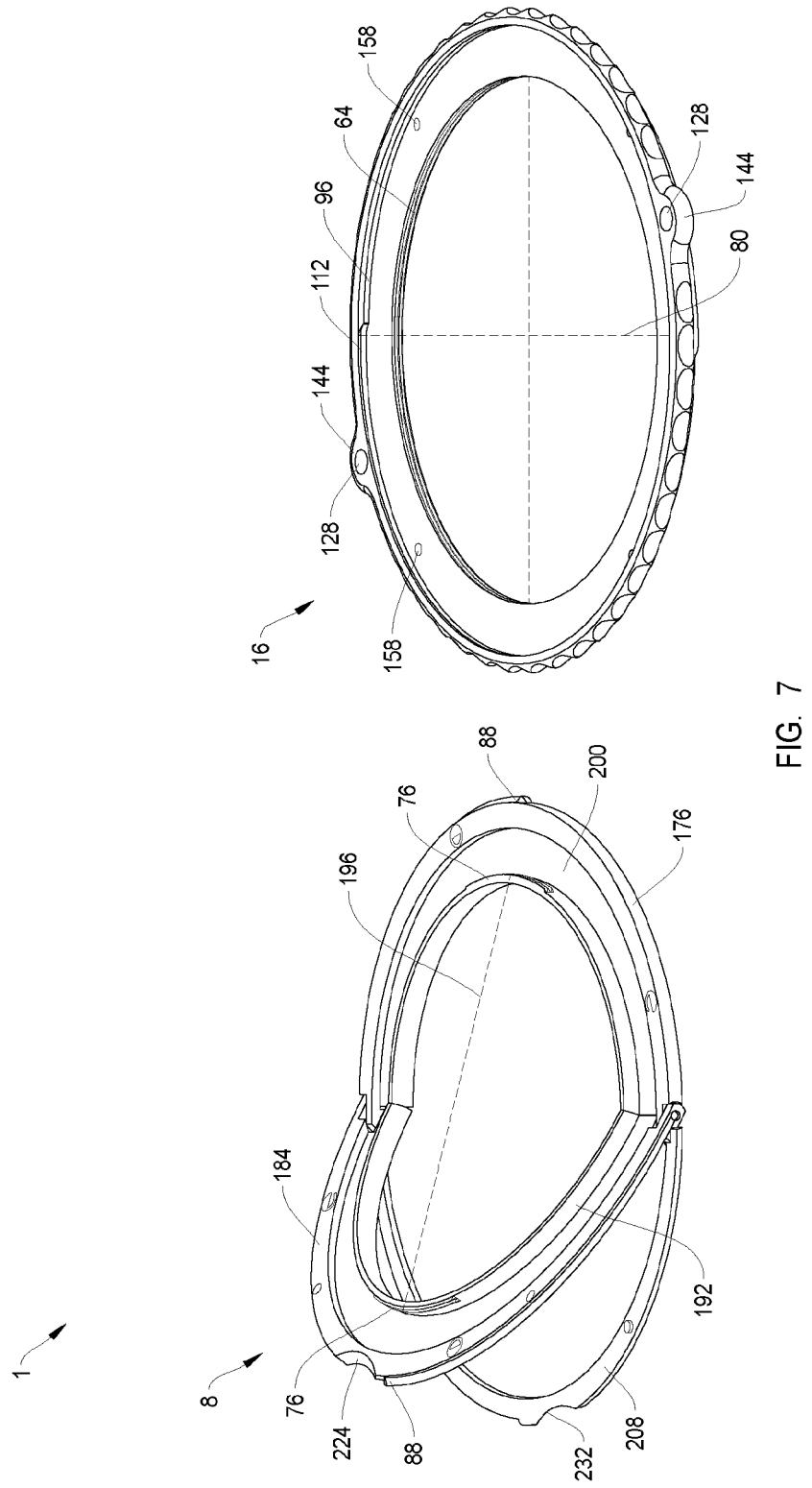

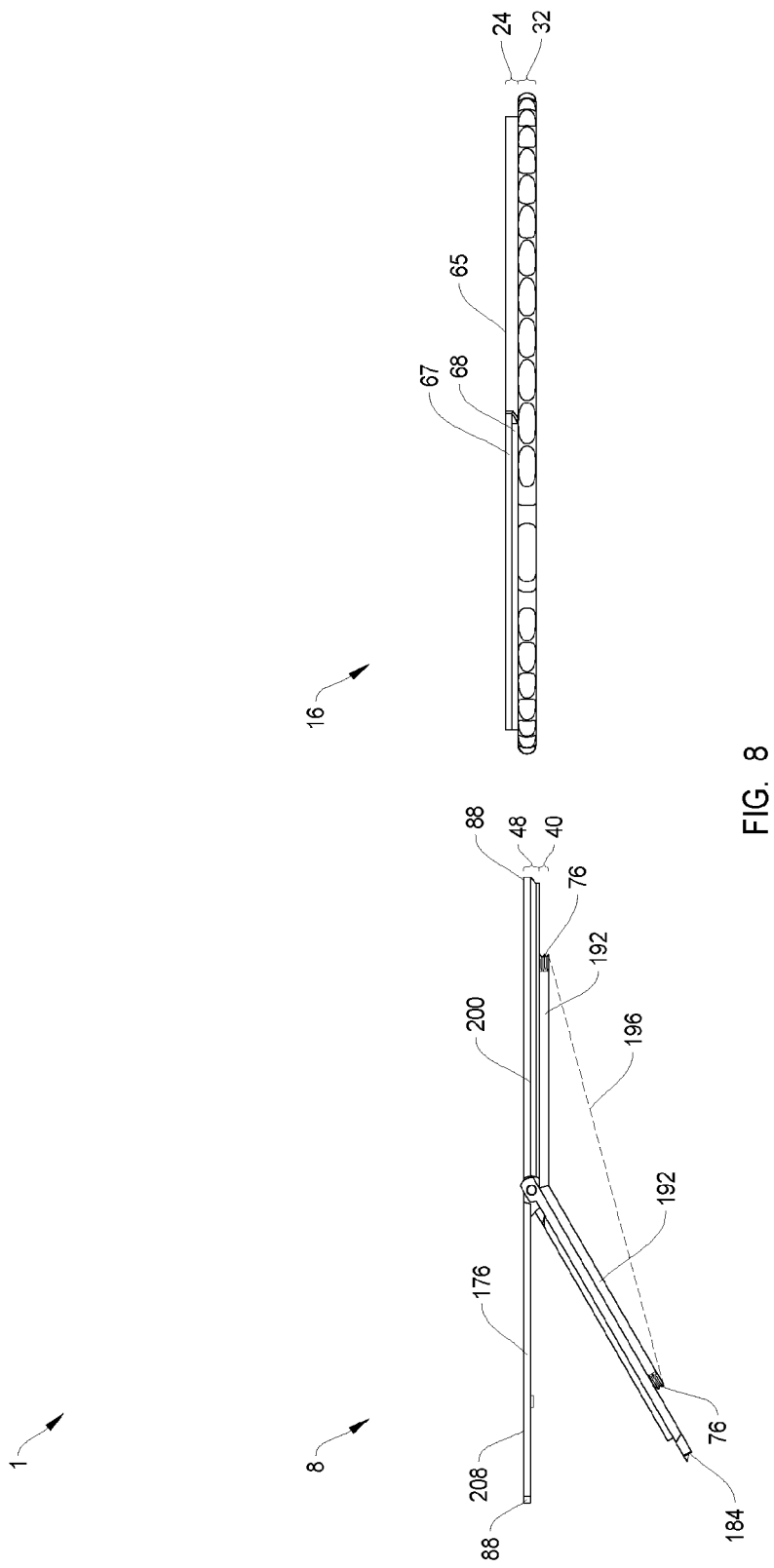

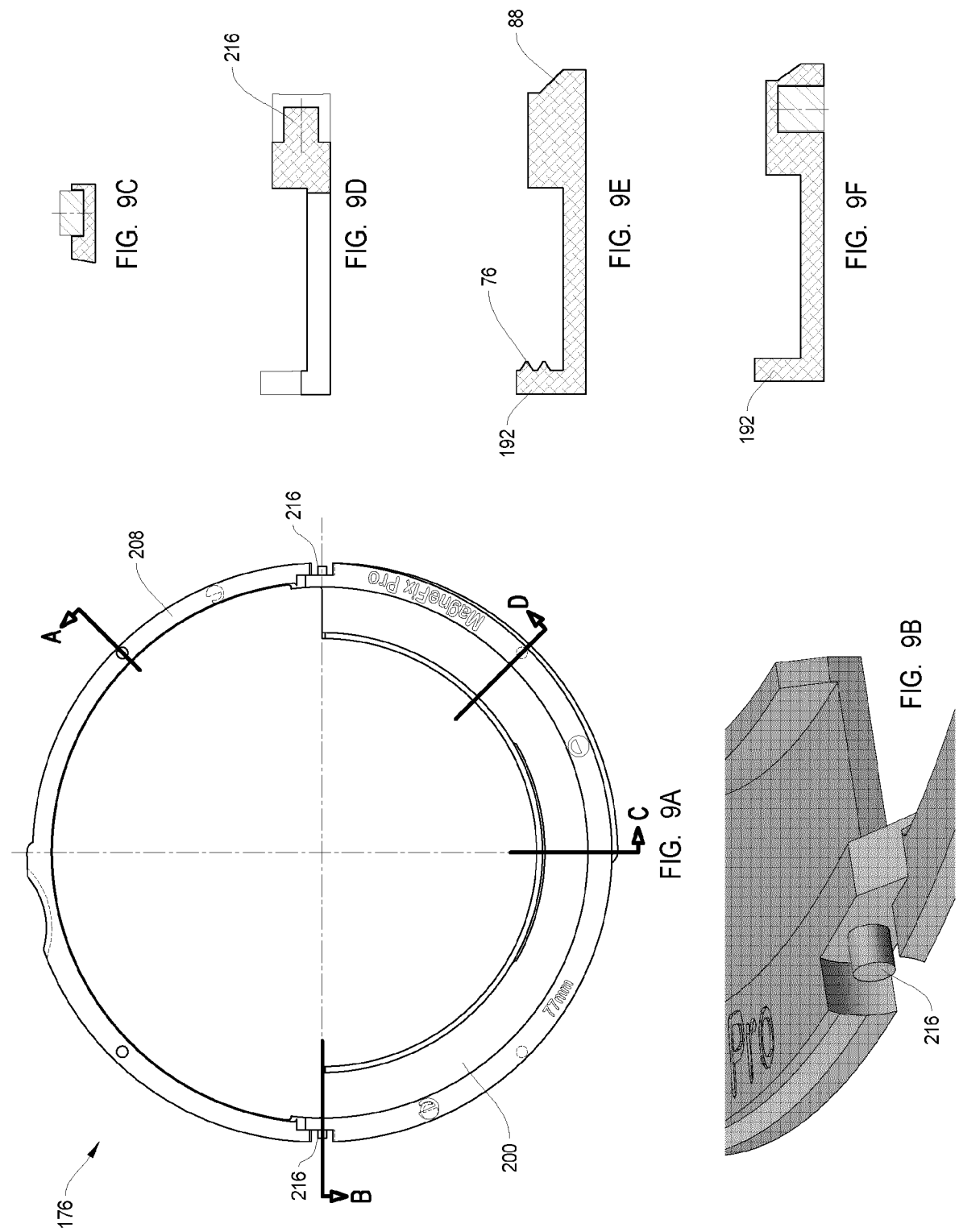

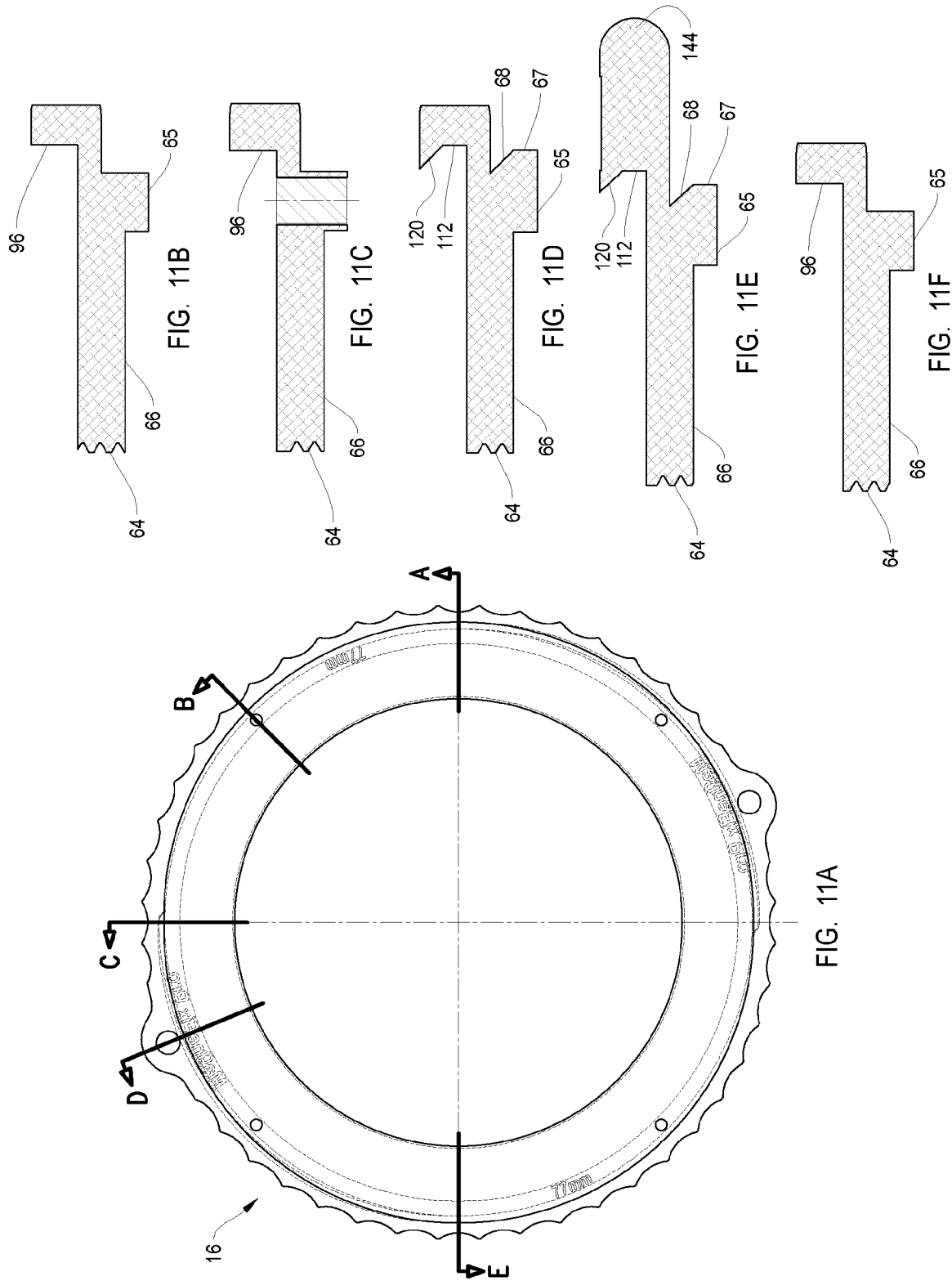

CAMERA FILTER ADAPTOR KIT

RELATED PATENT APPLICATION

The present application is a National Stage Entry of International Application No. PCT/CA2016/051516, filed Dec. 21, 2016, which claims priority from U.S. provisional patent application No. 62/387,076, filed Dec. 23, 2015 and entitled "UNIVERSAL SYSTEM OF PHOTO FILTER ADAPTIVE MAGNETIC RINGS", the disclosure of which is hereby incorporated by reference in its entirety.

TECHNICAL FIELD

The present disclosure generally relates to accessories for photography and videography, and more particularly to adaptor kits for mounting a camera filter.

BACKGROUND

In photography and videography, a camera filter is an accessory that is placed over the camera lens along the optical path between the camera lens and the scene captured. Typically, the camera filter is formed of a material that modifies the properties of light passing through it. However, some camera filters are intended to substantially maintain the properties of the light and may be used to protect the lens. Types of camera filters include neutral density filters, polarizing filters, color filters, etc. Since different camera lens are provided in different sizes, camera filters are also provided in different sizes to match the camera lens sizes.

Typically, the camera filter is directly mounted to the camera lens, such as by screwing the camera filter to cooperating threads at the front of the camera lens. When operating a camera, a user (photographer or cameraman) may choose to use different camera lens and different camera filters to differently capture a scene. This requires the user to repeatedly swap lens and to swap the filters according to the intended use.

SUMMARY

According to one aspect, a kit for a camera filter adaptor includes a first filter retaining apparatus having a filter retaining portion and a first interfacing portion opposite the filter retaining portion, the filter retaining portion configured for retaining a first camera filter, and a lens engagement apparatus having a lens coupling portion and a second interfacing portion opposite the lens coupling portion, the lens coupling portion configured for being coupled to a camera lens, the coupling defining a lens coupling diameter of the lens coupling portion and the second interfacing portion configured for interfacing with the first interfacing portion of the filter retaining apparatus to form an engagement therewith, the interfacing defining an interfacing diameter being greater than the lens coupling diameter.

According to another aspect, a filter retaining apparatus includes a filter retaining portion configured for retaining a camera filter, the retaining defining a filter mount diameter of the filter retaining portion, and an interfacing portion opposite the filter retaining portion, the interfacing portion configured for forming an engagement with a lens engagement apparatus for engaging a camera lens, the locking engagement defining an interfacing diameter being greater than the filter mount diameter.

According yet to another aspect, a lens engagement apparatus includes a lens coupling portion configured for being coupled to a camera lens, the coupling defining a lens coupling diameter, and an interfacing portion opposite the lens coupling portion, the interfacing portion configured for forming an engagement with a filter retaining apparatus for retaining a camera filter, the locking engagement defining an interfacing diameter being greater than the lens coupling diameter.

According to yet another aspect, a method of mounting a camera filter to a camera lens includes mounting the camera filter to a first filter retaining apparatus, mounting to the camera lens a lens engagement apparatus, and engaging the first filter retaining apparatus to the lens engagement apparatus, the engagement therebetween defining an interfacing diameter being greater than a lens diameter of the camera lens.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 2 illustrates a bottom perspective view of the adaptor kit according to the example embodiment;

FIG. 3 illustrates a top plan view of the adaptor kit according to the example embodiment;

FIG. 4 illustrates a bottom plan view of the adaptor kit according to the example embodiment;

FIG. 5 illustrates an elevation view of the adaptor kit according to the example embodiment in which the lens engagement apparatus is in a coupling configuration thereof;

FIG. 6 illustrates a top perspective view of the adaptor kit according to the example embodiment in which the lens engagement apparatus is in a release configuration thereof;

FIG. 7 illustrates a bottom perspective view of the adaptor kit according to the example embodiment in which the lens engagement apparatus is in the release configuration thereof;

FIG. 8 illustrates an elevation view of the adaptor kit according to the example embodiment in which the lens engagement apparatus is in the release configuration thereof;

FIG. 9A illustrates a bottom plan view of a first arc member of the lens engagement apparatus according to the example embodiment;

FIG. 9B illustrates a close-up view of a portion of the first arc member of the lens engagement apparatus;

FIG. 9C illustrates a cross-sectional view along the line A of FIG. 9A;

FIG. 9D illustrates a cross-sectional view along the line B of FIG. 9A;

FIG. 9E illustrates a cross-sectional view along the line C of FIG. 9A;

FIG. 9F illustrates a cross-sectional view along the line D of FIG. 9A;

FIG. 11A illustrates a bottom plan view of the filter retaining apparatus according to the example embodiment;

FIG. 11B illustrates a cross-sectional view along the line A of FIG. 11A;

FIG. 11C illustrates a cross-sectional view along the line B of FIG. 11A.

FIG. 11D illustrates a cross-sectional view along the line C of FIG. 11A;

FIG. 11E illustrates a cross-sectional view along the line D of FIG. 11A;

FIG. 11F illustrates a cross-sectional view along the line E of FIG. 11A;

Figure 1:
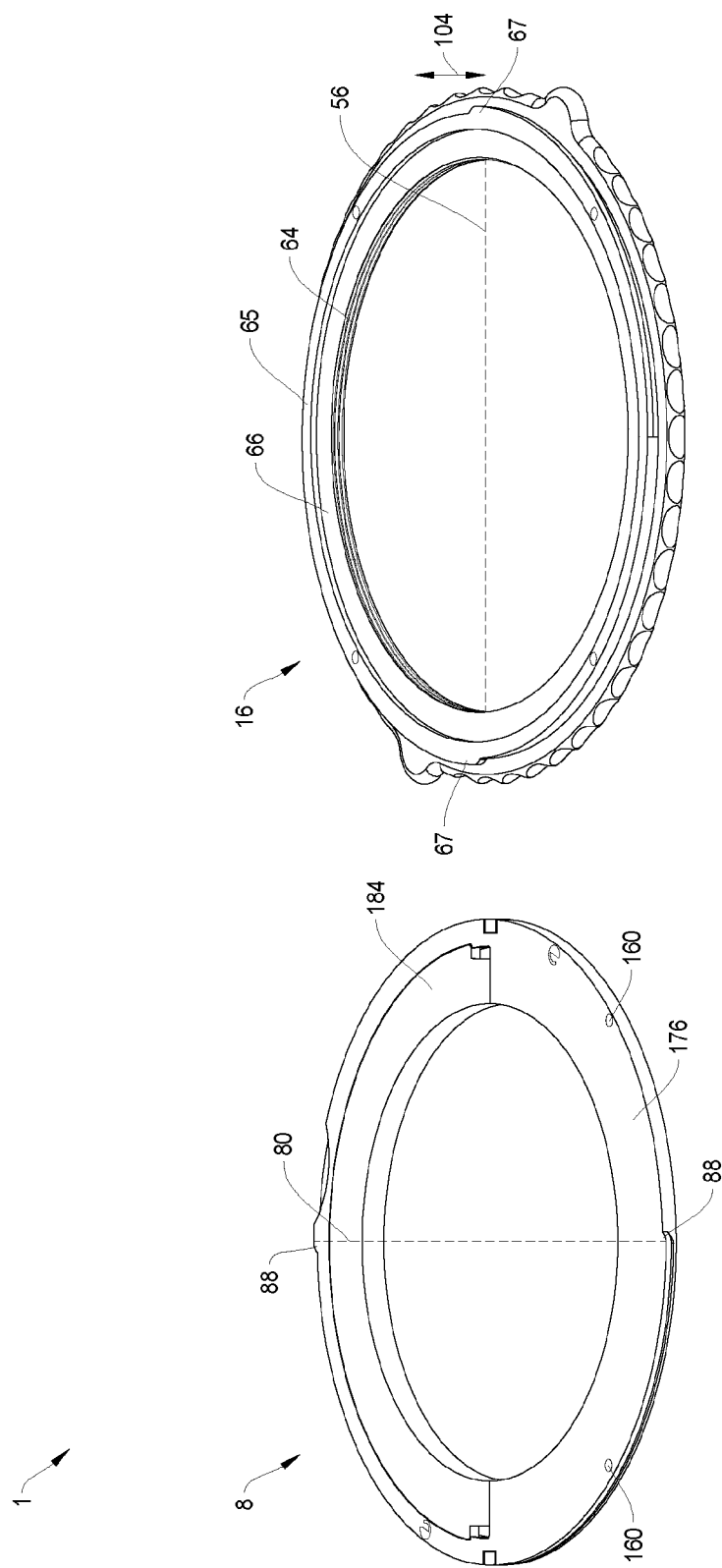
FIG. 1 illustrates a top perspective view of an adaptor kit according to one example embodiment, the kit having a lens engagement apparatus and a filter retaining apparatus.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

Referring now to FIGS. 1 to 5, therein illustrated is a top perspective view, a bottom perspective view, a top plan view, and bottom plan view and an elevation view, respectively, of a camera filter adaptor kit 1 according to an example embodiment. The camera filter adaptor kit 1 includes a lens engagement apparatus 8 and a filter retaining apparatus 16. The lens engagement apparatus 8 is operable to engage a camera lens and be mounted thereto. The filter retaining apparatus 16 is operable to have a camera filter mounted onto it. The lens engagement apparatus 8 and the filter retaining apparatus 16 is further configured to interface with one another to form an engagement therebetween. The engagement may be a locking engagement. After forming the locking engagement, the lens engagement apparatus 8 and the filter retaining apparatus 16 can be further released from one another by manipulating one or both of the lens engagement apparatus 8 and the filter retaining apparatus 16.

Referring now to FIG. 5, the filter retaining apparatus 16 includes a filter retaining portion 24 and an interfacing portion 32, which may be a first interfacing portion of the adaptor kit 1. The lens engagement apparatus 8 includes a lens coupling portion 40 and an interfacing portion 48, which may be a second interfacing portion of the adaptor kit 1.

For example, and as illustrated, the filter retaining portion 24 corresponds to an upper portion of the filter retaining apparatus 16 and the first interfacing portion 32 corresponds to a lower portion of the filter retaining apparatus 16 located opposite the upper portion. Where the filter retaining apparatus 16 is a generally annular member, the filter retaining portion 24 may form a first annular sub-member and the interfacing portion 32 may form a second annular sub-member. The filter retaining apparatus 16 and the filter retaining portion 24 may be integrally formed.

The filter retaining portion 24 provides the retaining of a camera filter. The retaining of the camera filter defines a filter mount diameter 56 of the filter retaining portion 24. For example, and as illustrated, the camera filter is a circular filter having a circular rim supporting the filtering portion (ex: glass or similar material). The camera filter may have outer threads that screw onto inner threads 64 of the filter retaining portion 24, whereby a circumferential threaded engagement is formed and the camera filter is retained by the filter retaining portion 24. It will be appreciated that this threaded engagement is the same as a threaded engagement of a standard camera lens having inner threads that receive outer threads of a standard circular camera filter. The filter mount diameter 56 of the retaining portion 24 is the same as the diameter of the outer threads of the camera filter, which further defines a diameter of the camera filter.

While a circular camera filter is illustrated, it will be understood that other mechanisms for retaining the cameral filter may be applied, such as the filter retaining portion 24 clipping a camera filter that is a piece of glass (ex: without a supporting rim).

According to one example embodiment, and as illustrated, the filter retaining portion 24 further includes a circumferential rim 65 that extends upwardly from an upper surface 66 of the filter retaining portion 24. At least two engagement tabs 67 extend outwardly radially from the circumferential rim 65. For example, and as illustrated, the engagement tabs 67 are positioned opposite one another. The engagement tabs 67 may also each extend along an arc of the circumferential rim 65. As illustrated in FIGS. 11D and 11E, the engagement tabs 67 define with the upper surface 66 of the filter retaining portion 24 a gap 68. A camera accessory, such as a second camera filter or a lens hood may be attached to the filter retaining portion 24 via engagement with the engagement tabs 67. For example, locking elements of the camera accessory may be received within the gap 68. The camera accessory may be attached in addition to attachment of the camera filter via the inner threads 64.

The lens coupling portion 40 is configured for coupling to a front of a camera lens, whereby the lens engagement apparatus 8 becomes mounted to the camera lens. The coupling of the lens coupling portion 40 to the camera lens defines a lens coupling diameter 72 of the lens coupling portion 40. For example, the camera lens may be circular may have inner threads located at a front portion thereof. The lens coupling portion 40 has lens engagement members 76 that engage the inner threads so as to be mounted to the camera lens. For example, the lens coupling portion 40 has outer threads that screw onto the inner threads of the camera lens.

According to one example, and as illustrated and described hereinbelow, the lens coupling portion 40 includes radially extending engagement tabs 76 that engage the inner threads of the camera lens.

The lens coupling diameter 72 is defined by the engagement members of the lens coupling portion 40 and is the same as the diameter of the inner threads of the camera lens, which further defines a diameter of the camera lens.

The first interfacing portion 32 of the filter retaining apparatus 16 and the second interfacing portion 48 of the lens engagement apparatus 8 cooperate to form the locking engagement of the filter retaining apparatus 16 with the lens engagement apparatus 8. After forming the locking engagement therebetween, the first interfacing portion 32 of the filter retaining apparatus 16 and the second interfacing portion 48 of the lens engagement apparatus 8 can be released from one another by an application of a force on one or both of the filter retaining apparatus 16 and the lens engagement apparatus 8. As described elsewhere herein, the force for releasing the apparatuses 8 and 16 may include a rotational (ex: twisting force).

The locking engagement of the first interfacing portion 32 of the filter retaining apparatus 16 with the second interfacing portion 48 of the lens engagement apparatus 8 defines an interfacing diameter 80. More particularly, the interfacing diameter 80 is defined by parts of the first interfacing portion 32 that cooperate with parts of the second interfacing portion 48 to provide their mutual locking engagement.

According to one example embodiment, and as illustrated in FIGS. 1 to 6, the second interfacing portion 48 is generally circular and includes a plurality of engagement tabs 88 extending radially outwardly. The engagement tabs 88 may be positioned diametrically opposite one another. As illustrated in FIG. 9E, showing a cross-sectional view, the radially extending engagement tab 88 may be beveled. Furthermore, as illustrated in FIGS. 7, and 11B to 11F, the first interfacing portion 32 of the filter retaining apparatus 16 has an inner sidewall 96 extending in an axial direction 104. One or more slots 112 are formed in the inner sidewall 96 and extend in an outward direction. The slots may be positioned diametrically opposite one another. The slots 112 are sized to receive the plurality of radially extending engagement tabs 88 of the second interfacing portion 48 of the lens engagement apparatus 8. The radially extending engagement tabs 88 being received within the slots 112 forms the locking engagement of the first interfacing portion 32 of the filter retaining apparatus 16 with the second interfacing portion 48 of the lens engagement apparatus 8. When an axial force is applied on the one or both of the lens engagement apparatus 8 and the filter retaining apparatus 16, the radially extending engagement tabs 88 abut against an upper lip 120 of portions of the sidewall 96 that define the slots 112, which prevents separation of the lens engagement apparatus 8 and the filter retaining apparatus 16 from one another. The distance between oppositely positioned engagement tabs 88 of the second interfacing portion 48, which corresponds to the distance between oppositely position slots 112 of the first interfacing portion 32, defines the interfacing diameter 80.

While the interfacing diameter 80 is defined from a circumferential engagement of the first interfacing portion 32 of the filter retaining apparatus 16 with the second interfacing portion 48 of the lens engagement apparatus 8 in the illustrated example, it will be understood that in other example embodiments the interfacing diameter 80 may be defined by a non-circumferential engagement thereof.

Referring back to FIGS. 1 to 6, due to engagement tabs 88 extending radially outwardly, the second interfacing portion 48 may be slightly oblong in that a first distance between the outer edges of oppositely positioned radially extending engagement tabs 88 is greater that a second distance between opposite outer edges of the second interfacing portion 48 that do not have the engagement tabs (such as portions offset by 90 degrees from the engagement tabs 88).

Similarly, referring back to FIG. 4, a circumference defined by the inner sidewall 96 of the interfacing portion 32 of the filter retaining apparatus 16 may also be slightly oblong in that a third distance between opposite inner edges of inner sidewalls 96 that do not have slots 112 formed therein is greater than a fourth distance between the inner edges of the oppositely positioned slots 112. Furthermore, the distance between opposite inner edges of inner sidewalls 96 that do not have slots 112 formed therein may substantially correspond with the distance between the outer edges of oppositely positioned radially extending engagement tabs 88 of the second interfacing portion 48.

Accordingly, to form the locking engagement, the second interfacing portion 48 is received within the first interfacing portion 32 wherein the radially extending engagement tabs 88 (defining the first distance) are first aligned with opposite inner edges sidewalls 96 that do not have slots 112 formed therein (defining the third distance). This first alignment may be indicated by alignment of a first set of visual markings 128 on an underside of the first interfacing portion 32 with a second set of visual markings 136 on an upper side of the second interfacing portion 48. The first set of visual markings 128 may also correspond with protruding tabs 144 provided on the filter retaining apparatus 8 for facilitating manipulation.

Subsequently to forming the first alignment, one or both of the lens filter retaining apparatus 16 and the lens engagement apparatus 8 is rotated so as to guide the radially extending engagement tabs 88 into the slots 112 to form the locking engagement, which corresponds to a second alignment of the first and second interfacing portions 32, 48. Application of a rotation in an opposite direction returns to the first alignment, whereby the first interfacing portion 32 and the second interfacing portion 48 may be disengaged from one another.

According to an example embodiment, and as illustrated in the Figures, a first set of magnetic elements 158 are angularly distributed about the first interfacing portion 32 and a second set of magnetic elements 160 are angularly distributed about the second interfacing portion 48. The first and second sets of magnetic elements 158, 160 are positioned so that they form a mutual magnetic coupling when the radially extending tabs 88 are receiving in the slots 112. This magnetic coupling may reduce accidental disengagement of the filter retaining apparatus 116 from the lens engagement apparatus 8. It will be appreciated that an angular force that is sufficient to overcome the magnetic attraction of the first and second sets of magnets 158 and 160 must be applied in order to rotate one or both of the filter retaining apparatus 16 and lens engagement apparatus 8 to the first alignment to disengage them from one another.

In one example embodiment, and as illustrated, additional magnetic elements may be angularly distributed on one or both of the first interfacing portion 32 and the second interfacing portion 48. The additional magnetic elements are positioned to provide magnetic coupling when the first alignment is formed, which provides tactile feedback to a user to indicate that one or both of the lens engagement apparatus 8 and filter retaining apparatus 16 are properly positioned to be rotated to form their mutual locking engagement.

According to one example embodiment, and as illustrated in FIGS. 1 to 10F, the lens engagement apparatus 8 includes a first arc member 176 and a second arc member 184 pivotally attached to the first arc member 176. At least a first engagement member 76 is located on the first arc member 176 and at least a second engagement 76 is located on the second arc member 184. The first arc member 176 may be an annular member, as illustrated.

The lens coupling portion 40 corresponds to an annular wall 192 extending axially from an upper portion of the lens engagement apparatus 8 that forms the second interfacing portion. As illustrated, a first portion of the annular wall 192 is provided on the first arc member 176 and a second portion of the annular wall 192 is provided on the second arc member 184. The first lens engagement member 76 extends radially from the portion of the annular wall 192 of the first arc member. The second lens engagement member 76 extends radially from the portion of the annular wall 192 of the second arc member 184.

The lens engagement apparatus 8 is in a coupling configuration when the second arc member 184 is pivoted to a position where it is substantially coplanar with the first arc member 176. For example, FIGS. 1 to 5 illustrate the coupling configuration of the lens engagement apparatus 8. It will be appreciated that in the coupling configuration, and as best shown in FIGS. 4 and 5, the first lens engagement member 76 located on the first arc member 176 is spaced apart from the second lens engagement member 76 located on the second arc member 184 by a distance corresponding to the lens coupling diameter 72.

The lens engagement apparatus 8 is in a release configuration when the second arc member 184 is pivoted to a position where it forms a non-zero angle with the first arc member 176. For example, FIGS. 6 to 8 illustrate the release configuration of the lens engagement apparatus 8. It will be appreciated that in the coupling configuration, and as best shown in FIG. 8, the first lens engagement member 76 located on the first arc member 176 is spaced apart from the second lens engagement member 76 located on the second arc member by a distance 196 that is less than the coupling diameter 72.

According to the illustrated example (FIGS. 9A to 9f), the first arc member 176 has a thicker semi-circular portion 200 and a thinner semi-circular portion 208. An upper portion of the thicker semi-circular portion 200 forms the interfacing portion 48 of the lens engagement apparatus 8 and includes a radially extending engagement tab 88. A lower portion of the thicker semi-circular portion 200 includes part of the annular wall 192 and one of the engagement members 76. The thinner semi-circular portion 208 has another of the radially extending engagement tabs 88 and acts to define a boundary of the pivotal movement of the second arc member 184.

The second arc member 184 (FIGS. 10A to 10E) is pivotally attached to posts 216 of the first arc member 176 formed at boundaries between the thicker semi-circular portion 200 and the thinner semi-circular portion 208. The range of pivotal motion of the second arc member 184 is limited at one boundary from abutting of the second arc member 184 against the thinner semi-circular portion 208 and is limited at the other boundary from the contacting of the annular wall 192 on each of the first arc member 176 and the second arc member 184. As illustrated, a lower portion of the second arc member 184 includes part of the annular wall 192 and another one of the engagement members 76. In the illustrated example (FIG. 10E), a portion of one of the radially extending engagement tabs 88 is formed in the second arc member 184.

In operation, the lens engagement apparatus 8 is initially brought to its release configuration by pivoting the second arc member 184. The engagement members 76 are further positioned between a frontal wall of a camera lens. The second arc member 184 is further pivoted towards the coupling configuration of the lens engagement apparatus 8, wherein the distance 196 between the opposite engagement members 76 is increased, until the engagement members 76 contacts inner threads formed in the frontal wall of the camera lens. This causes the engagement members 76 to lockingly engage the camera lens. It will be appreciated that the inner threads of the camera lens are typically provided for mounting of a camera filter. It will be further appreciated that the lens coupling diameter of the lens coupling portion 40 corresponds to the lens coupling diameter 72.

To release the lens engagement apparatus 8 from the camera lens, the second arc member 184 is pivoted towards the release configuration, whereby the engagement members 76 are disengaged from the inner threads of the camera lens. For example, a first notch 224 is formed on an outer edge of the first arc member 176 and a second notch 232 is formed on an outer edge of the second arc member 184, each notching providing accessing to the other arc member 184, 176. The first arc member 176 and second arc member 184 may be pushed away from another via the notches 224, 232 which causes pivoting of the second arc member 184 towards the release configuration.

Figure 10C:
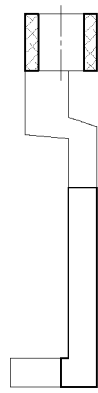
FIG. 10C illustrates a cross-sectional view along the line A of FIG. 10A.
Figure 10D:
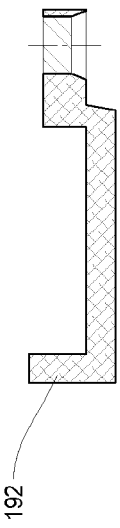
FIG. 10D illustrates a cross-sectional view along the line B of FIG. 10A.
Figure 10E:
FIG. 10E illustrates a cross-sectional view along the line C of FIG. 10A.
Figure 10F:
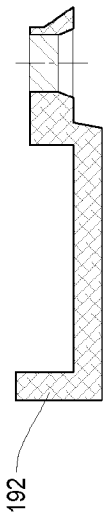
FIG. 10F illustrates a cross-sectional view along the line D of FIG. 10A.
Figure 10A:
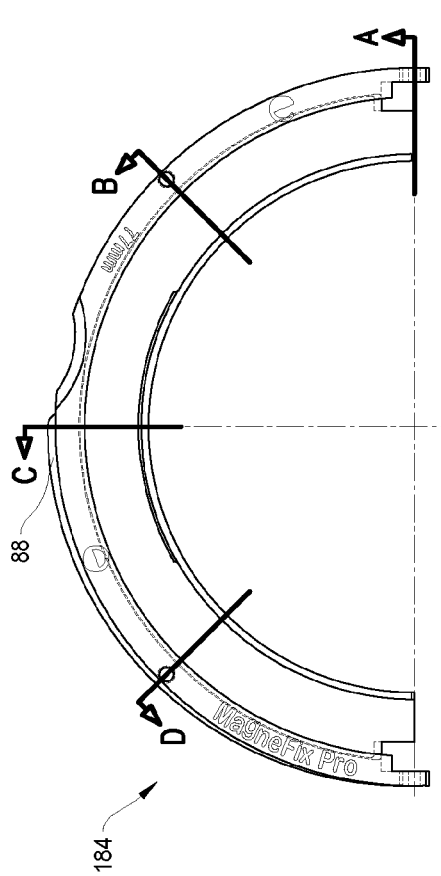
FIG. 10A illustrates a bottom plan view of a lower arc member of the lens engagement apparatus according to the example embodiment.
Figure 10B:
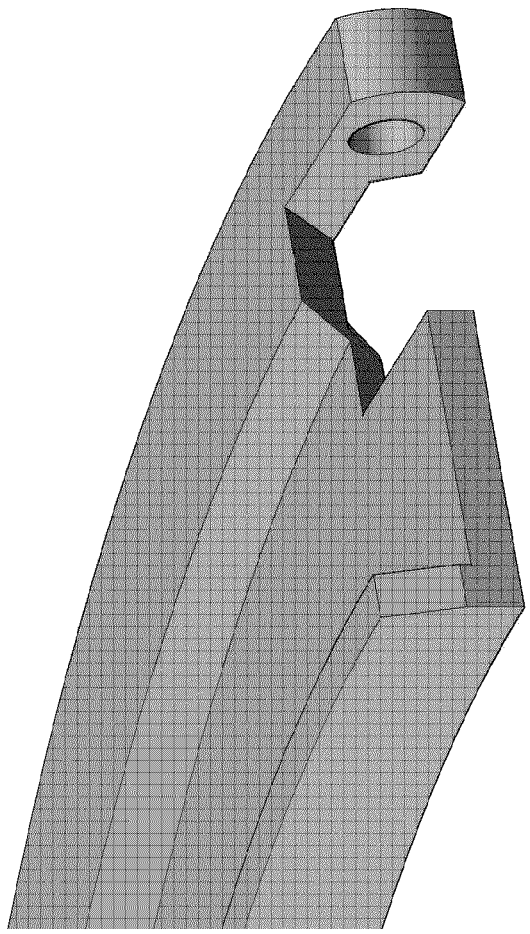
FIG. 10B illustrates a close-up view of a portion of the lower arc member of the lens engagement apparatus.

According to an example embodiment, and as illustrated in FIG. 9E, which illustrates a cross-section of the first arc member 176 at the location of an engagement member 76, and in FIG. 10E, which illustrates a cross-section of the second arc member 184 at the location of another engagement member 76, each engagement member 76 is a set of outer threads. Accordingly, the lens coupling portion 40 can be mounted onto a camera lens by screwing the engagement members 76 to the inner threads of the camera lens even when in the coupling configuration.

Figure 12:
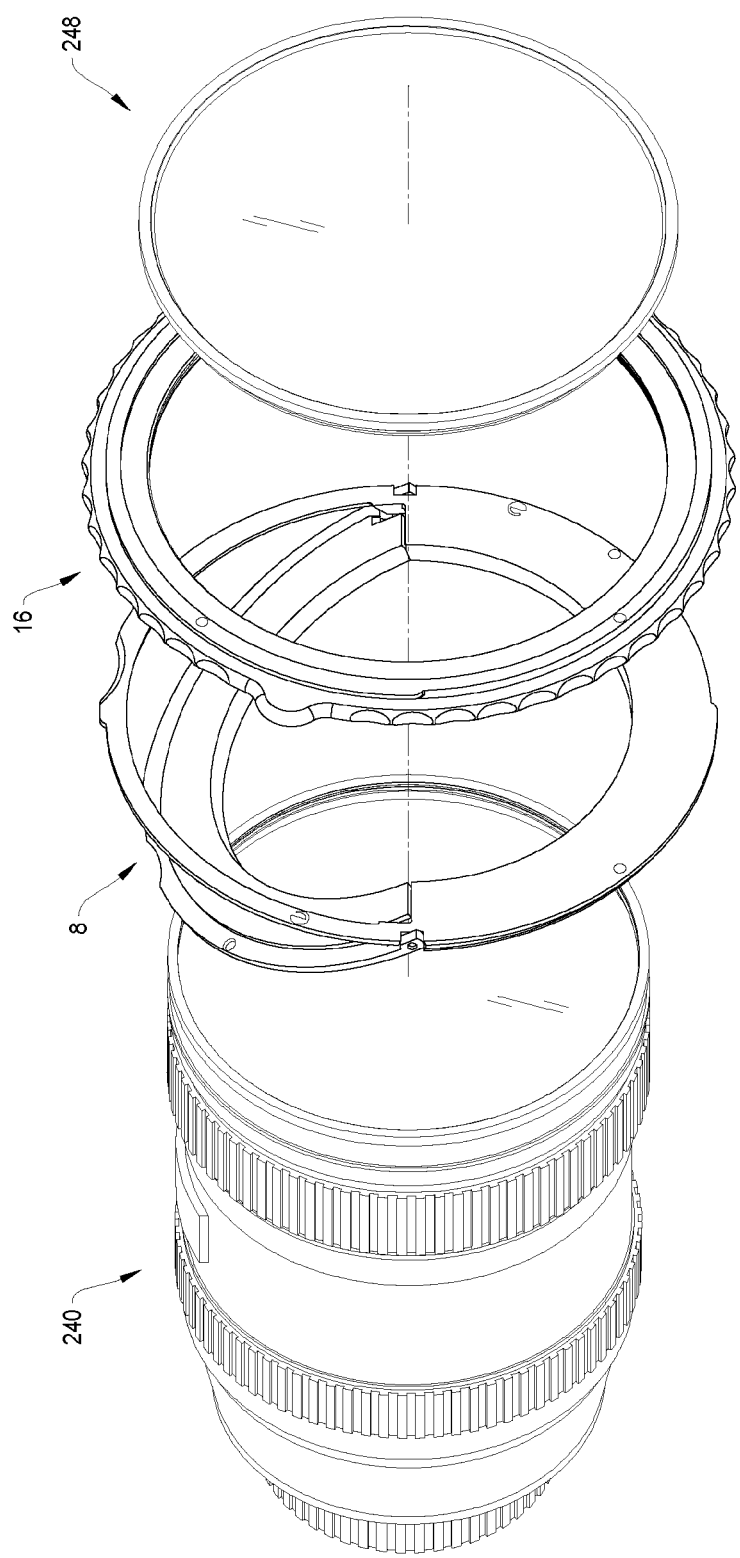
FIG. 12 illustrates a front perspective exploded view of a typical camera lens, the filter retaining apparatus, the lens engagement apparatus and a camera filter in alignment for mounting a camera filter and mounting to a camera lens, according to an example embodiment.
Figure 13:
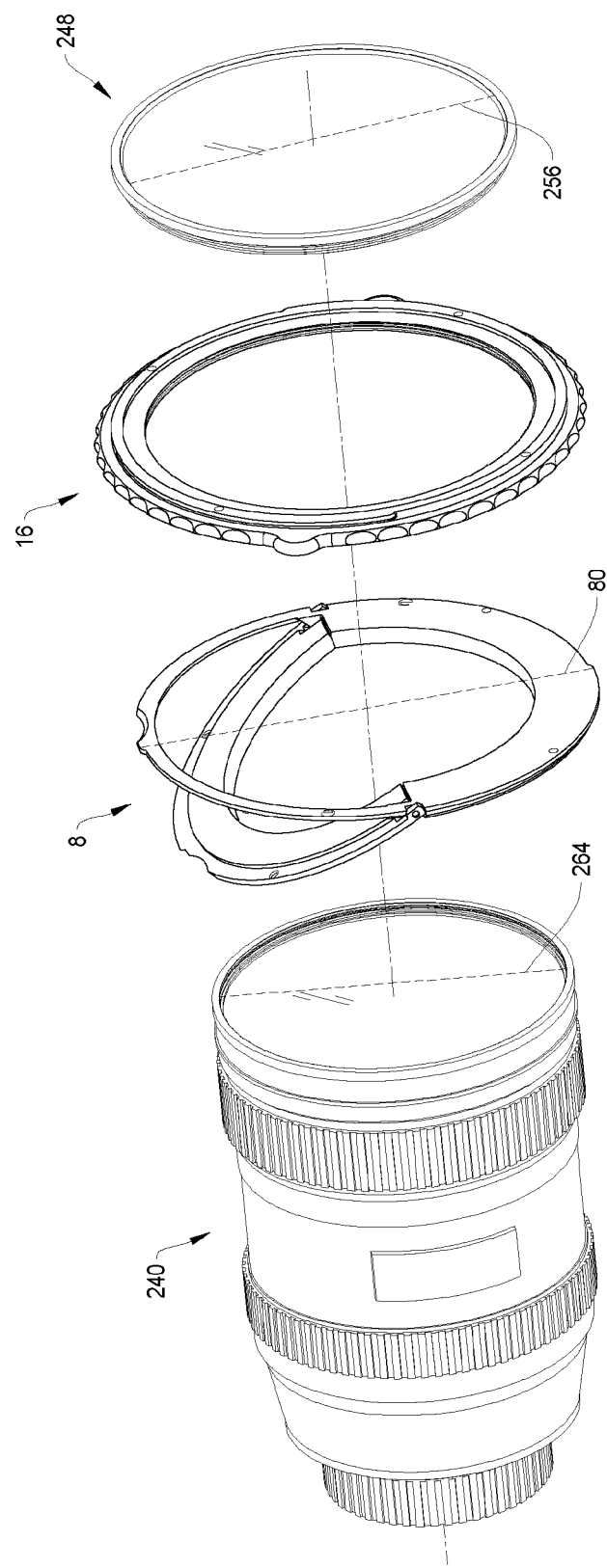
FIG. 13 illustrates a front exploded view of the filter retaining apparatus and the lens engagement apparatus in alignment for mounting a camera filter and mounting to a camera lens according to an example embodiment.
Figure 14:
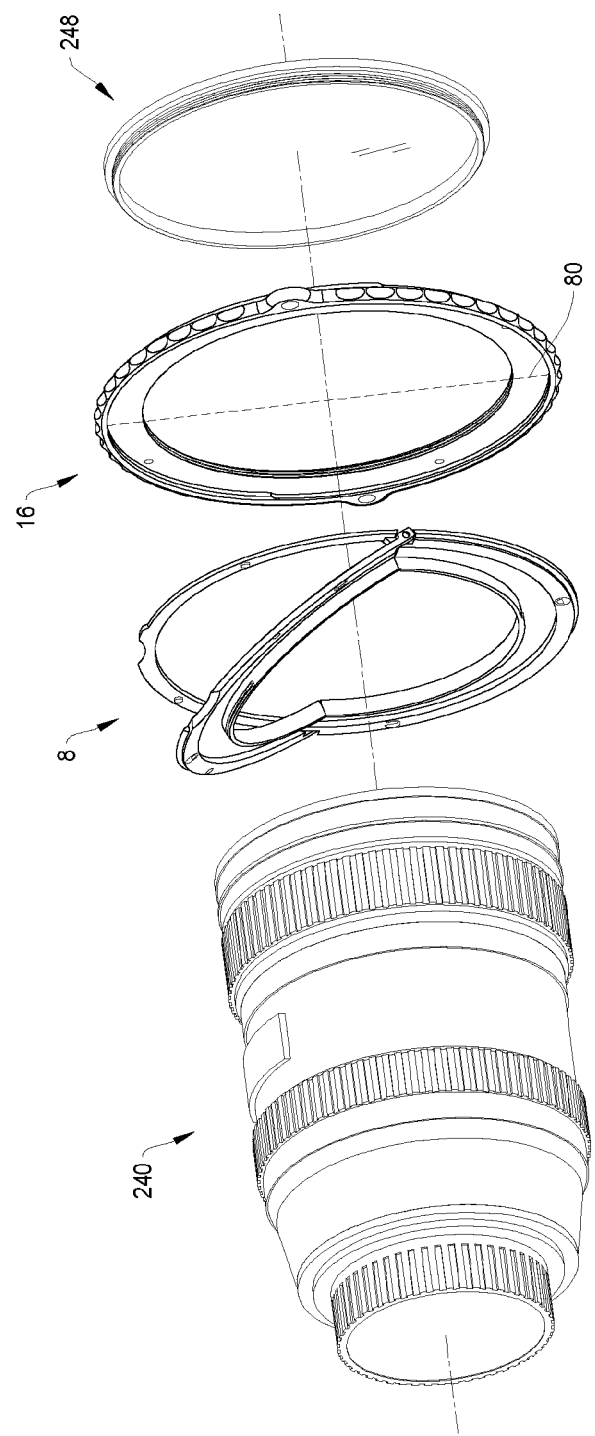
FIG. 14 illustrates a rear exploded view of the filter retaining apparatus and the lens engagement apparatus in alignment for mounting the camera filter and mounting to the camera lens according to the example embodiment.
Figure 15:
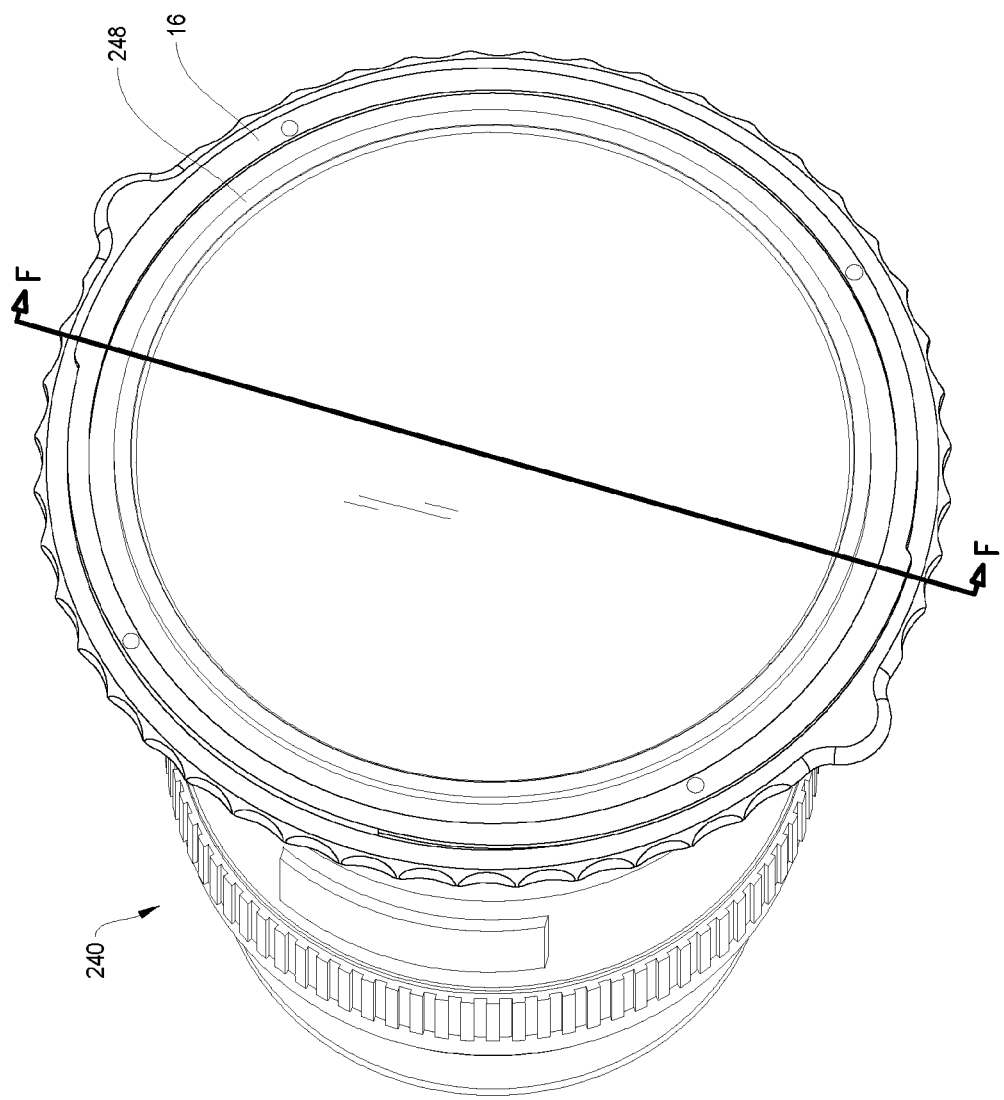
FIG. 15 illustrates a front perspective view showing the filter retaining apparatus and the lens engagement apparatus having the camera filter mounted thereto and being mounted to the camera lens.
Figure 16:
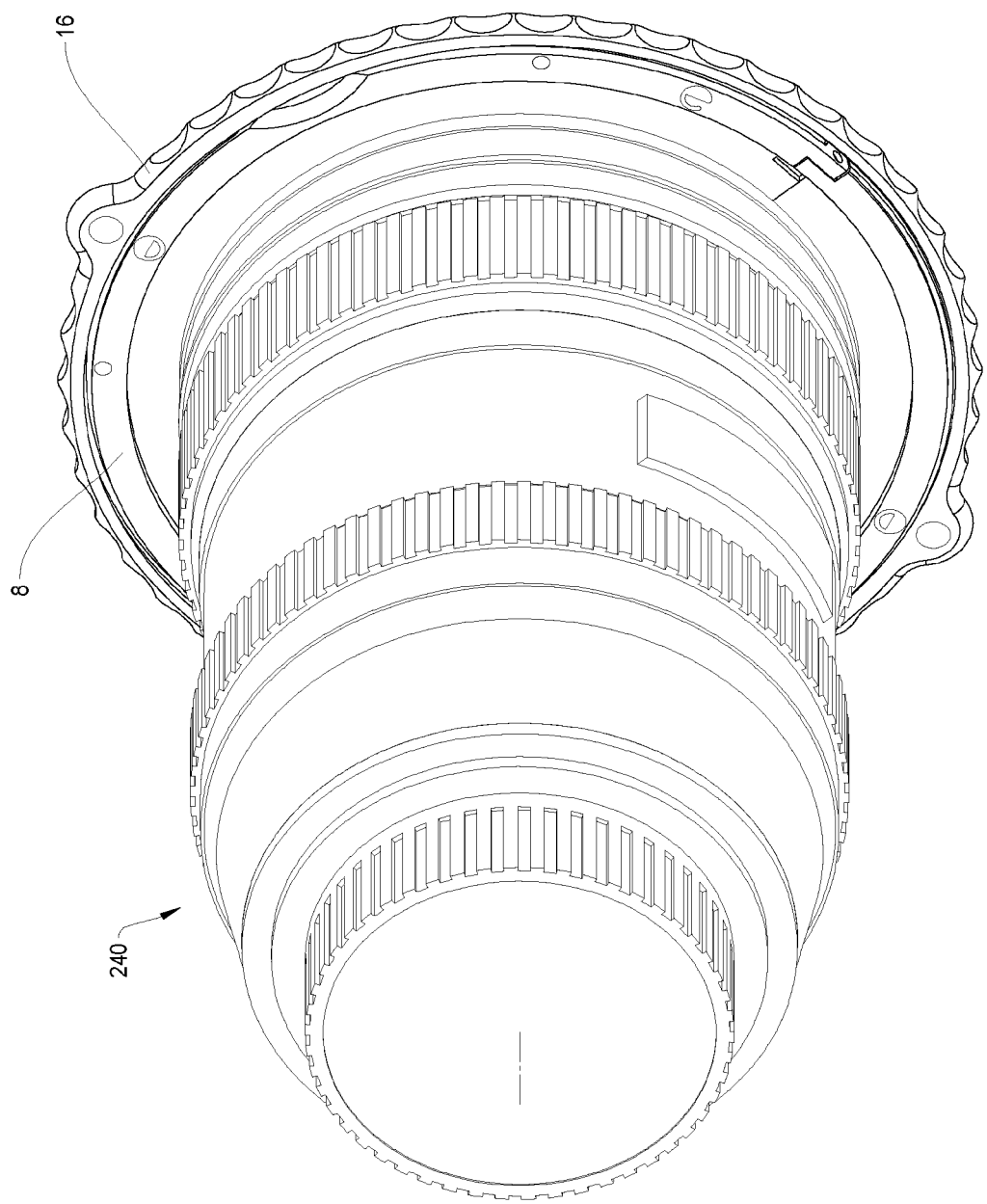
FIG. 16 illustrates a rear perspective view showing the filter retaining apparatus and the lens engagement apparatus having the camera filter mounted thereto and being mounted to the camera lens.

Referring now to FIGS. 12 to 14 the lens engagement apparatus 8 and the filter retaining apparatus 16 are in alignment with a camera lens 240 and camera filter 248. The camera filter 248 is mounted to the filter retaining portion 24 of the filter retaining apparatus 16 according to various examples described herein. The lens coupling portion 40 is mounted to the camera lens 240 according to various example embodiments described herein. Furthermore, the interfacing portion 32 of the first retaining apparatus 16 is lockingly engaged to the interfacing portion 48 of the lens engagement apparatus 8 according to various example embodiments described herein. Accordingly, the camera filter 248 is mounted to the camera lens 240 via the filter retaining apparatus 16 and the lens engagement apparatus 8.

Figure 17:
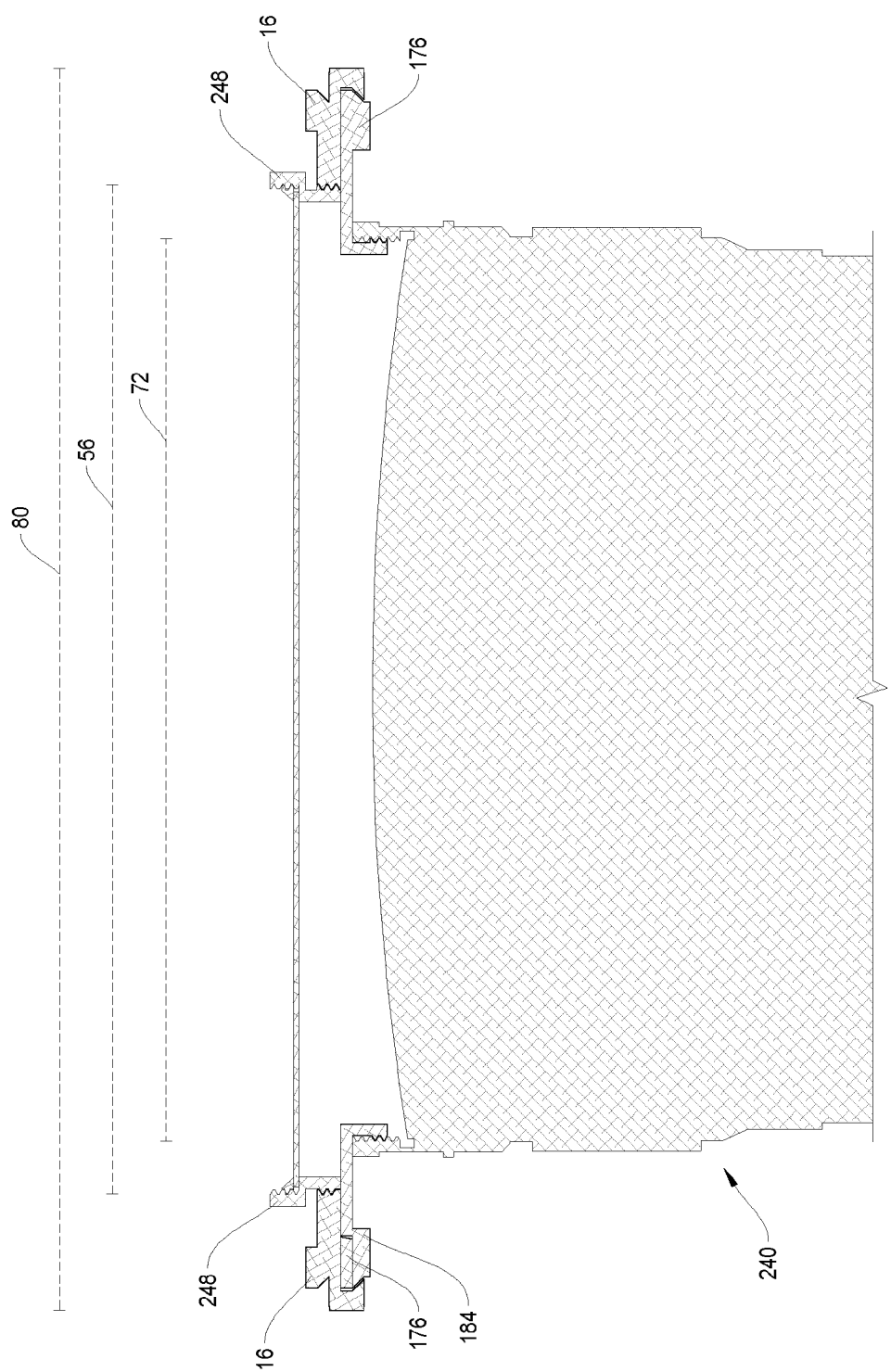
FIG. 17 illustrates a cross-sectional view in the direction F-F showing the filter retaining apparatus and the lens engagement apparatus having the camera filter mounted thereto and being mounted to the camera lens.

FIG. 17 illustrates a cross-sectional view in the direction F-F showing the filter retaining apparatus 16 and the lens engagement apparatus 8 having the camera filter 248 mounted thereto and being mounted to the camera lens 240. The lens engagement apparatus 8 is engaged to the camera lens 240 via engagement of engagement members 76 with inner threads of the camera lens 240. The camera filter 248 is mounted to the filter retaining apparatus 16 via engagement of outer threads of the camera filter 248 with inner threads 64 of the filter retaining apparatus 16. Locking engagement is formed between the filter retaining apparatus 16 and the lens engagement apparatus 8. It will be appreciated that in the illustrated example, the interfacing diameter 80 is greater than both the filter diameter 56 and the lens coupling diameter 72. Furthermore, the filter diameter 56 and the lens coupling diameter 72 are different (ex: the filter diameter 56 is greater than the lens coupling diameter 72).

According to various embodiments, the interfacing diameter 80 defined by engagement of the first interfacing portion 32 of the filter retaining apparatus 16 with the second interfacing portion 48 of the lens engagement apparatus 8 is greater than the lens coupling diameter 72. By providing an interfacing diameter 80 that is greater than the lens coupling diameter 72, a camera filter 248 having a filter diameter 256 that is different from the camera lens diameter 264 may be mounted via the camera filter adaptor kit 1. For example, the filter retaining portion 24 of the filter retaining apparatus 16 may be configured to have a filter mount diameter 56 that corresponds to the interfacing diameter 80 or is less than the filter mount diameter 56. Accordingly, the filter mount diameter 56 may be less than the interfacing diameter 80. Furthermore, the filter mount diameter 56 may be greater than the lens coupling diameter 72.

The difference in diameters allows interoperable use of a camera lens 240 of a given lens diameter 264 with a camera filter 248 of a given filter diameter 256 without requiring that the given lens diameter 264 match the given filter diameter 256 (where the given lens diameter 264 is equal to the given filter diameter 256) or requiring the use of specifically-sized adaptor that provides the specific matching between the lens diameter 264 with the given filter diameter 256 (where the given lens diameter 264 is different from given filter diameter 256). Where a camera filter 248 having a filter diameter 256 that is less than the lens diameter 264 of a camera lens 240 is used, some vignetting may be exhibited on images captured.

For example, a plurality of camera filters 248 having different filter diameters 256 may be used with a single camera lens 240 having a given lens diameter 264 by mounting to the camera lens 240 a lens engagement apparatus 8 having a lens coupling diameter 72 matching the lens diameter 264. Furthermore, each of the camera filters 248 are respectively mounted to a filter retaining apparatus 16 having a filter mount diameter 56 matching the filter diameter 256 of that camera filter 248 and an interfacing diameter that matches the interfacing diameter of the lens engagement apparatus 8. It will be appreciated that each of the lens engagement apparatus 8 and filter retaining apparatuses 16 have the same interfacing diameter 80. Accordingly, any one of the filters 248 may be used with the single camera lens 240 by selectively lockingly engaging the filter retaining portion 24 of one of the filters 248 to the lens engagement apparatus 8.

Similarly, a given single camera filter 248 having a given filter diameter 256 may be used with a plurality of camera lenses 240 having different lens diameters 264 by mounting the camera filter 248 onto a filter retaining apparatus 16 having a filter mount diameter 56 matching filter diameter 256. Furthermore, each of the camera lens 240 respectively has mounted onto it a lens engagement apparatus 8 having a lens coupling diameter 72 matching the lens diameter 264 of the camera lens 240 and an interfacing diameter that matches the interfacing diameter of the filter retaining apparatus 16. It will be appreciated that each of the lens engagement apparatuses 8 and the filter retaining apparatus 16 have the same interfacing diameter 80. Accordingly, the camera filter 248 may be used on any one of the camera lenses 240 by selectively lockingly engaging the filter retaining portion 32 to the lens engagement apparatus 8 mounted onto the camera lens 240 to be used.

Where a plurality of camera lenses 240 of different diameters and a plurality of camera filters 248 are to be used, each of the camera lenses 240 is mounted with a lens engagement apparatus 8 that has a lens coupling diameter 72 matching the lens diameter 264 of that camera lens 240 and all the lens engagement apparatuses 8 have the same interfacing diameter. Similarly, each of the camera filters 248 are mounted onto a filter retaining apparatus 16 that has a filter mount diameter 56 matching that camera filter 248 and all the filter retaining apparatuses 16 have the same interfacing diameter. Furthermore, the interfacing diameter of the filter retaining apparatuses 16 is the same as the interfacing diameter of the lens engagement apparatuses 8. Since all the lens engagement apparatuses 8 and all the filter retaining apparatuses 16 have the interfacing diameter 80, any one of the filter retaining apparatuses 16 may be lockingly engaged to any one of the lens engagement apparatuses 8. Accordingly, any one of the camera filters 248 may be mounted onto any one of the camera lenses 240 via the locking engagement formed by their respective filter retaining apparatus 16 and lens engagement apparatus 8, despite the differences in their filter diameters 256 and lens diameters 264. It may be understood that the camera filter adaptor kit 1 described herein according to various example embodiments is a universal kit in that it allows use of camera filters across a range of different diameters 256 with camera lenses across a range of lens diameters 264.

According to one example embodiment, the interfacing diameter 80 is greater than the lens coupling diameter 72 by at least 5 mm.

According to one example embodiment, the interfacing diameter 80 is greater than the lens coupling diameter 72 by at least 15 mm.

According to one example embodiment, the interfacing diameter 80 is greater than the lens coupling diameter 72 by at least 10 percent of the lens coupling diameter 72.

According to one example embodiment, the interfacing diameter 80 is greater than the lens coupling diameter 72 by at least 25 percent of the lens coupling diameter 72.

According to one example embodiment, the interfacing diameter 80 is greater than the filter mount diameter 56 by at least 5 mm.

According to one example embodiment, the interfacing diameter 80 is greater than the filter mount diameter 56 by at least 15 mm.

According to one example embodiment, the interfacing diameter 80 is greater than the filter mount diameter 56 by at least 10 percent of the filter mount diameter 56.

According to one example embodiment, the interfacing diameter 80 is greater than the filter mount diameter 56 by at least 25 percent of the filter mount diameter 56.

According to one example embodiment, the filter mount diameter 56 is greater than the lens coupling diameter 72 by at least 5 mm.

According to one example embodiment, the filter mount diameter 56 is greater than the lens coupling diameter 72 by at least 15 mm.

According to one example embodiment, the filter mount diameter 56 is greater than the lens coupling diameter 72 by at least 10 percent of the lens coupling diameter 72.

According to one example embodiment, the filter mount diameter 56 is greater than the lens coupling diameter 72 by at least 25 percent of the lens coupling diameter 72.

According to one example embodiment, a camera filter adaptor kit 1 may be provided for consumer grade or professional grade camera lens and camera filters across a range of common camera diameters and filter diameters. Each of the lens engagement apparatus 8 and the filter retaining apparatus 16 have an interfacing diameter 80 of approximately 101 mm. The lens engagement apparatus 8 may have a lens coupling diameter 72 chosen from 49 mm, 52 mm, 55 mm, 58 mm, 60 mm, 62 mm, 67 mm, 72 mm, 77 mm, 82 mm, 86 mm, and 95 mm. Similarly, the filter retaining apparatus 16 may have a filter mount diameter 56 chosen from 49 mm, 52 mm, 55 mm, 58 mm, 60 mm, 62 mm, 67 mm, 72 mm, 77 mm, 82 mm, 86 mm, and 95 mm. It will be appreciated that a camera lens having a lens diameter of any one of the common sizes listed above may be used with a filter of any one of the common sizes listed above. It will be appreciated that the interfacing diameter 80 is at least 5 mm greater than the largest diameter of filter and lens and over twice the size of the smallest diameter of filter and lens.

According to another example embodiment, a camera filter adaptor kit 1 may be provided for professional grade or specialty camera lens and camera filters across a range of common camera diameters and filter diameters. Each of the lens engagement apparatus 8 and the filter retaining apparatus 16 have an interfacing diameter 80 of approximately 150 mm. The lens engagement apparatus 8 may have a lens coupling diameter 72 chosen from 67 mm, 72 mm, 77 mm, 82 mm, 86 mm, 105 mm, 107 mm, 112 mm, 122 mm, 125 mm, 127 mm et 138 mm. Similarly, the filter retaining apparatus 16 may have a filter mount diameter 56 chosen from 67 mm, 72 mm, 77 mm, 82 mm, 86 mm, 105 mm, 107 mm, 112 mm, 122 mm, 125 mm, 127 mm et 138 mm.

According to yet another example embodiment, a camera filter adaptor kit 1 may be provided for consumer grade or recreational grade camera lenses and filters across a range of common diameters and filter diameters. Each of the lens engagement apparatus 8 and the filter retaining apparatus 16 have an interfacing diameter 80 of approximately 84 mm. The lens engagement apparatus 8 may have a lens coupling diameter 37 mm, 43 mm, 46 mm, 49 mm, 52 mm, 55 mm, 58 mm, 60 mm, 62 mm, 67 mm, 72 mm et 77 mm. Similarly, the filter retaining apparatus 16 may have a filter diameter 56 chosen from 37 mm, 43 mm, 46 mm, 49 mm, 52 mm, 55 mm, 58 mm, 60 mm, 62 mm, 67 mm, 72 mm et 77 mm.

It will be understood that while a list of common camera lens and filter sizes have been provided above, other sizes of interfacing diameters 80, filter mount diameters 56 and lens coupling diameters 72 may be used within the kit 1.

According to various example embodiments, the camera filter adaptor kit 1 may include more than one lens engagement apparatus 8 and/or more than one filter retaining apparatus 16. The lens engagement apparatuses 8 and the filter retaining apparatus 16 all have the same interfacing diameter 80 but may have different filter mount diameters 56 and/or lens coupling diameters 72. Accordingly, the camera filter adaptor kit 1 is provided to be ready for use with multiple camera lenses 240 of different sizes and/or multiple camera filters 248 of the different sizes.

According to a method of mounting a camera filter to a camera lens, a filter retaining apparatus 16 as described herein is provided and a lens engagement apparatus 8 as described herein is provided. The camera filter is mounted onto the filter retaining apparatus 16. The lens engagement apparatus 8 is mounted onto the camera lens. The filter retaining apparatus 16 is then lockingly engaged to the lens engagement apparatus 8 via the interfacing of their respective interfacing portions 32, 48. To swap the camera filter currently being used, the filter retaining apparatus 16 is disengaged from the lens engagement apparatus 8 and another filter retaining apparatus 16 having the other filter to be used is lockingly engaged to the lens engagement apparatus 8 still mounted to the camera lens. The other filter may have a different filter diameter 256. It will be appreciated that the camera filter being used may be swapped without having to the change the component that is mounted to the lens. More particularly, the camera filter is changed while mounting of the lens engagement apparatus 8 to the camera lens 240 is maintained.

Advantageously, various examples of the camera filter adaptor kit 1 allows reducing of the number of filters that need to be acquired or carried for a project. In a common situation where a filter diameter of a camera filter must be matched to a lens diameter and a set of different types of filters must be acquired/carried for each camera lens diameter, the number of components required is the product of the number of lens diameters with the number of types of filters. For example, where three lens of different diameters are used and four different types of filters are required, a total 3×4=12 filters are required. By contrast, according to various camera filters adaptor kit described herein, a single set of the different types of filters may be used for all of the lenses.

Advantageously, various examples of the camera filter adaptor kit 1 facilitates swapping of camera filters during use. In a situation where the filter diameter must be matched to the lens diameter, the user must identify that the diameter of a selected filter matches the lens diameter of the camera lens. By contrast, according to various camera filters adaptor kit described herein, this identification is not required where all of the filter retaining apparatuses having interfacing diameters that matches the interfacing diameters of the lens engagement apparatuses.

Furthermore, it was observed that a common source of frustration for users is the requirement to manipulate the camera filter that is directly mounted to the camera lens, for example, by applying the screwing and unscrewing of the camera filter. Advantageously, various examples of the camera filter adaptor kit 1 may simplify the task of swapping camera filters by having only to engage and disengage respective interfacing portions of the filter retaining apparatus and the lens engagement apparatus and without having dismount the lens engagement apparatus that is mounted onto the camera lens.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A kit for a camera filter adaptor, the kit comprising:
   a first filter retaining apparatus having a filter retaining portion and a first interfacing portion opposite the filter retaining portion, the filter retaining portion configured for retaining a first camera filter; and
   a lens engagement apparatus having a lens coupling portion and a second interfacing portion opposite the lens coupling portion, the lens coupling portion configured for being coupled to a camera lens, the coupling defining a lens coupling diameter of the lens coupling portion and the second interfacing portion configured for interfacing with the first interfacing portion of the filter retaining apparatus to form an engagement therewith, the interfacing defining an interfacing diameter being greater than the lens coupling diameter, and the lens engagement portion comprising:
   a first arc member having at least a first radially extending engagement member and;
   a second arc member having at least a second radially extending engagement member, the second arc member being pivotally attached to the first arc member;
   wherein in a coupling configuration, the first arc member and the second arc member are substantially coplanar and the first and second radially extending member define a first distance therebetween substantially corresponding to the lens coupling diameter; and
   wherein in a release configuration, the first arc member is oriented transversely to the second arc member and the first and second radially extending members define a second distance therebetween being less than the lens coupling diameter.

2. The kit of claim 1, wherein the first interfacing portion forms a locking engagement with the second interfacing portion.

3. The kit of claim 1, wherein the lens coupling diameter is defined by a diameter of the camera lens.

4. The kit of claim 1, wherein the interfacing diameter is greater than the lens coupling diameter by at least 10 percent of the lens coupling diameter.

5. The kit of claim 1, wherein the retaining of the camera filter defines a filter mount diameter of the filter retaining portion; and
   wherein the interfacing diameter is greater than a filter mount diameter.

6. The kit of claim 5, wherein the interfacing diameter is greater than the filter mount diameter by at least 10 percent of the filter mount diameter.

7. The kit claim 5, wherein the filter mount diameter is greater than the lens coupling diameter.

8. The kit of claim 1, wherein the second interfacing portion of the lens engagement apparatus is configured to form a releasable locking engagement with the first interfacing portion of the filter retaining apparatus.

9. The kit of claim 1, wherein in the coupling configuration, the first and second radially extending engagement members engage inner threads of the lens, thereby locking the lens engagement apparatus to the camera lens; and
   wherein in the release configuration, at least one of the first and second radially extending engagement members is disengaged from the inner threads of the camera lens.

10. The kit of claim 1, wherein the second interfacing portion of the lens engagement apparatus comprises a plurality of radially extending engagement tabs configured to cooperate with the first interfacing portion of the filter retaining apparatus.

11. The kit of claim 10, wherein the radially extending engagement tabs are beveled.

12. The kit of claim 10, wherein the first interfacing portion of the filter retaining apparatus comprises an annular wall extending in an axial direction, the annular wall having formed therein one or more slots for receiving the plurality of engagement tabs of the second interfacing portion of the lens engagement apparatus.

13. The kit of claim 1, wherein the first interfacing portion of the filter retaining apparatus comprises a first set of angularly distributed magnetic elements;
   wherein the second interfacing portion of the lens engagement apparatus comprises a second set of angularly distributed magnetic elements configured for engaging the first set of magnetic elements when the lens engagement apparatus is in the locked engagement with the filter retaining apparatus.

14. The kit of claim 1, wherein the retaining of the first camera filter defines a first filter mount diameter of the filter retaining portion of the first filter retaining apparatus;
   wherein the kit further comprises a second filter retaining apparatus having a filter retaining portion and an interfacing portion opposite the filter retaining portion, the filter retaining portion configured for retaining a second camera filter, the retaining defining a second filter mount diameter of the filter retaining portion of the second filter retaining apparatus;
   wherein the interfacing portion of the lens engagement apparatus is configured for selectively interfacing with the interfacing portion of the first filter retaining apparatus and the interfacing portion of the second filter retaining apparatus; and
   wherein the first filter mount diameter and the second filter mount diameter are different.

15. A lens engagement apparatus comprising:
   a lens coupling portion configured for being coupled to a camera lens, the coupling defining a lens coupling diameter; and
   an interfacing portion opposite the lens coupling portion, the interfacing portion configured for forming an engagement with a filter retaining apparatus for retaining a camera filter, the engagement defining an interfacing diameter being greater than the lens coupling diameter, and the lens engagement portion comprising:
   a first arc member having at least a first radially extending engagement member and;
   a second arc member having at least a second radially extending engagement member, the second arc member being pivotally attached to the first arc member;
   wherein in a coupling configuration, the first arc member and the second arc member are substantially coplanar and the first and second radially extending member define a first distance therebetween substantially corresponding to the lens coupling diameter; and
   wherein in a release configuration, the first arc member is oriented transversely to the second arc member and the first and second radially extending members define a second distance therebetween being less than the lens coupling diameter.

16. The lens engagement apparatus of claim 15, wherein the interfacing portion is configured to form a locking engagement with the filter retaining apparatus.

* * * * *